(12) United States Patent
Jang et al.

(10) Patent No.: US 8,852,767 B2
(45) Date of Patent: Oct. 7, 2014

(54) SAFETY APPARATUS AND PROTECTION METHOD OF SECONDARY BATTERY FOR ELECTRIC VEHICLE USING SWITCH

(75) Inventors: Sooyeup Jang, Daejeon (KR); Jeonkeun Oh, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 873 days.

(21) Appl. No.: 12/740,252

(22) PCT Filed: Sep. 23, 2008

(86) PCT No.: PCT/KR2008/005644
§ 371 (c)(1),
(2), (4) Date: Apr. 28, 2010

(87) PCT Pub. No.: WO2009/061075
PCT Pub. Date: May 14, 2009

(65) Prior Publication Data
US 2010/0247980 A1    Sep. 30, 2010

(30) Foreign Application Priority Data

Nov. 7, 2007 (KR) ................. 10-2007-0113296

(51) Int. Cl.
*H01M 2/00* (2006.01)
*B60L 3/00* (2006.01)
*B60L 11/18* (2006.01)
*H01M 10/0565* (2010.01)
*H01M 2/34* (2006.01)
*B60L 3/04* (2006.01)
*H01M 10/42* (2006.01)
*H01M 10/052* (2010.01)

(52) U.S. Cl.
CPC ............ *H01M 2/34* (2013.01); *H01M 10/4235* (2013.01); *B60L 3/0069* (2013.01); *B60L 11/1803* (2013.01); *H01M 10/0565* (2013.01); *B60L 11/1879* (2013.01); *H01M 2/345* (2013.01); *Y02T 10/7005* (2013.01); *Y02T 10/705* (2013.01); *Y02E 60/12* (2013.01); *B60L 3/04* (2013.01); *H01M 2200/20* (2013.01); *B60L 3/0046* (2013.01); *B60L 2250/10* (2013.01); *Y02T 10/7011* (2013.01); *H01M 10/052* (2013.01); *H01M 2220/20* (2013.01)
USPC ................. 429/10; 429/122; 429/61; 429/50; 200/61.08

(58) Field of Classification Search
CPC ... H01M 2/34; H01M 10/0565; H01M 2/345; H01M 10/4235; H01M 2200/20; H01M 10/052; B60L 3/0046; B60L 3/0069; B60L 3/04; B60L 11/1803; B60L 11/1879; B60L 2250/10; Y02T 10/705; Y02T 10/7011; Y02T 10/7005; Y02E 60/12
USPC ............................................................ 429/10
See application file for complete search history.

(56) References Cited

U.S. PATENT DOCUMENTS 5,221,861 A * 6/1993 Kinsell ..................... 307/9.1
2004/0247994 A1* 12/2004 Masuda et al. ............... 429/66
(Continued)

FOREIGN PATENT DOCUMENTS

| EP | 1406340 A | 4/2004 | |
| GB | 2385182 A * | 8/2003 | ............... F16P 3/00 |
| JP | 2000-231912 A | 8/2000 | |

(Continued)

*Primary Examiner* — Gary Harris
(74) *Attorney, Agent, or Firm* — The Webb Law Firm

(57) ABSTRACT

The present invention relates to a safety apparatus and a protection method of a secondary battery, which can prevent explosion and fire of the secondary battery using a switch or a rupture switch attached on the outside of the secondary battery if a swelling degree of the secondary battery reaches a predetermined value when the secondary battery is swelled due to abnormal usage such as overcharge, short-circuit, reverse-connection and heat-exposure of large-capacity lithium polymer battery.

3 Claims, 10 Drawing Sheets

(56) References Cited

U.S. PATENT DOCUMENTS

2007/0054157 A1 3/2007 Ryu et al.
2007/0210752 A1 9/2007 Yoon
2007/0262746 A1 11/2007 Kang et al.

FOREIGN PATENT DOCUMENTS

| | | |
|---|---|---|
| JP | 2004319463 A | 11/2004 |
| KR | 20070083173 A | 8/2007 |
| KR | 20070093165 A | 9/2007 |

* cited by examiner (a)

(b)

(a)　　　　　　　(b)　　　　　　　(c)

(a)

(b)

(c)

(a)

(b)

SAFETY APPARATUS AND PROTECTION METHOD OF SECONDARY BATTERY FOR ELECTRIC VEHICLE USING SWITCH

TECHNICAL FIELD

The present invention relates to a safety apparatus of a secondary battery, and more particularly, to a safety apparatus of a secondary battery which can prevent explosion and fire of the secondary battery using a switch or a rupture switch attached on the outside of the secondary battery if a swelling degree of the secondary battery reaches a predetermined value when the secondary battery is swelled due to abnormal usage such as overcharge, short-circuit, reverse-connection and heat-exposure of large-capacity lithium polymer battery.

BACKGROUND ART

Typically, the secondary battery is capable of being recharged and being large-scaled. Cadmium nickel, hydrogen nickel and lithium ion battery can be taken as representative examples. Amongst them, the lithium ion battery is promising as next-generation power source because it has superior characteristics such as longevity and high capacity. However, if the lithium ion battery is exposed to abnormal usage environment such as overcharge, short-circuit, reverse-connection and heat-exposure, the gas is generated within the battery due to electrochemical reaction, thereby increasing an internal pressure of the battery. The battery is swollen due to the increased internal pressure and particularly an electrolyte or an active material is partially decomposed to cause the internal pressure and temperature of the battery to be increased rapidly if the abnormal usage time such as overcharge is persisted, which results in danger of causing explosion and fire.

In order to verify the safety of the secondary battery, tests of overcharge, over-discharge, short-circuit and reverse-connection, as well as various heat stability tests of high temperature storage test, thermal shock test, and thermal exposure test are performed. The explosion or fire of the battery must not be included in conditions of such thermal stability tests.

An attempt to improve the stability of the secondary battery has been very widely made, and a method of exhausting gas generated within the secondary battery through a destruction unit of the battery case or a method of directly interrupting the battery circuit using a destruction disc within the battery has been developed. In this case, if the gas is generated in the condition such as overcharge to cause the internal pressure to exceed the design value, the spark generated at the time of destruction can serve as a source of ignition which causes explosion and a fire even though releasing the internal pressure and ensuring the stability in such a way that a sealing unit is destroyed or the power source of the battery is interrupted.

FIG. 1(a) is a cross-sectional view of prior secondary battery stability apparatus. As shown in FIG. 1(a), a secondary battery 4 configured of a case 2 and an electrode assembly 3 is housed in the secondary battery pack 1. A needle-type projecting portion 5 is equipped on the inside of the secondary battery pack 1. If the condition such as overcharge, short-circuit and reverse voltage occurs, a temperature of the secondary battery 4 increases and thus the electrolyte or the active material within the secondary cell 4 is converted into the gas phase, which results that the secondary cell 4 is swollen up.

If the secondary battery 4 is swollen up above the predetermined value, the explosion and fire of the secondary cell can be prevented by breaking the seal of the secondary battery using the needle-type projecting unit 5.

Since the prior technology of protecting the secondary battery 4 using the projecting portion 5 requires an additional production process, there are problems of decreasing productivity and not ensuring destruction reliability.

Further, there is a problem of contrary inconsistency that the stack portion must have sealing property and destruction property simultaneously.

There is a further problem in that a harmful gas is exhausted due to the explosion of the sealing unit caused by the internal pressure of the battery, which damages the electronic circuit and adversely affect the human body.

Since the case of a pouch-type secondary battery is formed of a flexible thin plate produced by mixing the metal material such as aluminum and resin material such as polymer resin, it is difficult to structure the safety apparatus according to the prior art.

FIG. 1(b) is a cross-sectional view of a safety apparatus of prior art rupture disc-type secondary battery. As shown in FIG. 1(b), a gas exhaust hole 7 is provided in a top portion of a cylindrical secondary battery and a cap cover 6 is separated from a cap 8 by a rupture disc 9. If an internal pressure of the cylindrical secondary battery increases, the internal pressure is delivered to the rupture disc 9 via the gas exhaust hole 7. If the internal pressure above the predetermined value is delivered, the rupture disc 9 is destroyed to cause the gas to be discharged so that a power source of the cylindrical secondary battery is interrupted, thereby preventing explosion and fire of the secondary battery.

The prior art using the rupture disc 9 has problems in that harmful gas is discharged when the disc is destroyed and operated and also the spark generated when the rupture disc 9 is destroyed serves as a fire source of the discharge gas, which results in fire and explosion. Further, there is a technological limit to directly interrupt the battery circuit in a case of the secondary battery for use in vehicle in which high voltage and large amount of current are applied.

DISCLOSURE

Technical Problem

An object of the present invention is to provide a safety apparatus of a secondary battery for use in electric vehicle using a switch which is allowed to prevent destruction due to swelling of it and prevent explosion and fire due to exhaust of harmful gas if an internal pressure the secondary battery for use in electric vehicle increases under the conditions of overcharge, short-circuit and heat-exposure when using the secondary battery for use in electric vehicle.

Technical Solution

In order to obtain the above objects, a secondary battery for use in electric vehicle having at least one secondary battery stacked according to the present invention comprises a switch unit 23 provided on one surface of a first secondary battery 21; and an operation inducing unit 24 provided on one surface of a second secondary battery 22 opposite to the switch unit 23 to cause the switch unit 23 to be operated.

Further, the switch unit 23 is equipped with an adjacent switch 150-1 and the operation inducing unit 24 is used with a magnet so that the adjacent switch 150-1 becomes off-state by a magnetic force of the magnet 36 if the adjacent switch 150-1 is close to the magnet 36 due to a swelling of the first secondary battery 21 and the second secondary battery 22.

Further, The adjacent switch 150-1 has a sealing structure and a sealing case 35 has an adhesive unit provided on one surface thereof and a first joining unit 31 having elasticity connected to a first switch lead 33 and a second joining unit 32 having elasticity connected to a second switch lead 34 provided therein.

Further, the adjacent switch 150-1 becomes on-state if the first joining unit 31 is connected to the second joining unit 32 whereas the adjacent switch 150-1 becomes off-state if the magnet 36 is close to it and thus the first joining unit 31 is separated from the second joining unit 32 by a magnetic field of the magnet 36, and the first joining unit 31 and the second joining unit 32 return to an original state if the magnet 36 is far away from it.

Further, the switch unit 23 is equipped with a micro switch 160-1 and the operation inducing unit 24 is used with the second secondary battery 22 so that the micro switch 160-1 becomes off-state when the first secondary battery 21 and the second secondary battery 22 are swollen.

Further, the micro switch 160-1 is consisted of a first stationary contact 41 and a second stationary contact 42 connected to the third switch lead 44 and a movable contact 43 connected to the fourth switch lead 45 within a housing 48, and the movable contact 43 has a press button 47 projected to the outside of the housing 48 on one side and a spring 46 provided on the other side of same position as that of the press button 47.

Further, the micro switch 160-1 becomes on-state if the first stationary contact 41 is connected to the movable contact 43 whereas the micro switch 160-1 becomes off-state if the second secondary battery 22 presses the press button 47 to cause the movable contact 43 to be connected to the second stationary contact 42, and the micro switch 160-1 returns to an original state due to a force of the spring 46 if the first secondary magnet 21 and the second secondary magnet 22 return to an original state.

A rupture switch according to the present invention comprises a first holding unit 50 attached to outside of a secondary battery for use in electric vehicle and having holding holes 50-1, 50-2 provided on one side of a "U" type metal piece for attaching and holding to the secondary battery for use in electric vehicle 110; a second holding unit 51 having a holding hole 51-1 provided on one end in other side of the "U" type metal piece for attaching and holding to the secondary battery for use in electric vehicle 110; a third holding unit 52 having a holding hole 52-1 equipped on other end in the other side of the "U" type metal piece for attaching and holding to the secondary battery for use in electric vehicle 110; a destruction unit 60 equipped in a center portion of the "U" type metal piece; and a fifth switch lead 70 and a sixth switch lead 75 attached to the second stationary unit 51 and the third stationary unit 52.

Further, the destruction unit 60 is consisted of a first destruction unit 61 and a second destruction unit 62, which are destroyed if the secondary battery for use in electric vehicle 110 undergoes a displacement greater than a prescribed value.

Further, the rupture switch 90-1 is applied with a flame-resistant insulating material having plasticity on overall surface in order to prevent diffusion of electric flame generated when the destruction unit 60 is destroyed.

Further, a safety apparatus of a secondary battery for use in electric vehicle using a switch according to the present invention comprises a secondary battery for use in electric vehicle 110 having at least one secondary battery stacked to supply power to an electric vehicle; a drive motor 140 generating a power of the electric vehicle; a battery controller 80 controlling a connection between the secondary battery for use in electric vehicle 110 and a power of the drive motor 140; and a switch apparatus of the secondary battery for use in electric vehicle and a rupture switch 90-1 which is connected to the battery controller 80 and is operated or destroyed in accordance with whether the secondary battery for use in electric vehicle 110 undergoes a displacement greater than a prescribed value, wherein the switch apparatus of the secondary battery for use in electric vehicle 110 and the rupture switch 90-1 control a relay connecting the secondary battery for use in electric vehicle 110 with the drive motor 140.

Further, the relay connecting the secondary battery for use in electric vehicle 110 with the drive motor 140 comprises a battery relay coil unit 100 connected to the switch apparatus of the secondary battery for use in electric vehicle 110 and the rupture switch 90-1 to be controlled by the battery controller 80; and a battery relay contact 105 controlling a connection between the secondary battery for use in electric vehicle 110 and the drive motor 140 using the battery relay coil unit 100.

Further, the battery relay contact 105 is consisted of a pair of a first battery relay contact 106 and a second battery relay contact 107, and the battery relay contact 105 has a first battery relay contact 106 and a second battery relay contact 107 operated independently by a plurality of battery relay coil units 100 in accordance with the number of control outputs outputted from an output unit 81 of the battery controller 80, Further, a charging unit 12 charging power generated by the secondary battery for use in electric vehicle and an inverter unit 130 controlling a velocity and a direction of the drive motor 140 are provided on the side of the drive motor 140.

Further, the battery controller 80 senses operation and destruction of the switch apparatus of the secondary battery for use in electric vehicle 110 and the rupture switch 90-1 to send an alarm signal to the electric vehicle when the secondary battery for use in electric vehicle 110 undergoes a displacement greater than a prescribed value.

Further, the switch apparatus of the secondary battery for use in electric vehicle and the rupture switch 90-1 further comprise at least one switch apparatus of the secondary battery for use in electric vehicle and the rupture switch 90-1 to 90-n attached to outside of the secondary battery, provided between the secondary batteries, or held on a holding structure for the secondary battery provided distinctly in accordance with the number of the secondary batteries composing the secondary battery for use in electric vehicle 110.

A protection method of a secondary battery for use in electric vehicle using a switch apparatus of the secondary battery for use in electric vehicle and a rupture switch according to the present invention comprises steps of controlling a connection between the secondary battery for use in electric vehicle 110 and a drive motor 140 and a power of the drive motor 140 by transmitting a control signal in a battery controller 80 of an electric vehicle (S10); causing the switch apparatus of the secondary battery for use in electric vehicle and the rupture switch to be operated and destroyed when the secondary battery for use in electric vehicle 110 undergoes a displacement greater than a prescribed value (S20); outputting a interrupt control signal by causing the operation and the destruction of the switch apparatus and the rupture switch 90-1 to be sensed by a battery relay coil unit 100 through a first switch lead 33, a second switch lead 34, a third switch lead 44, a fourth switch lead 45, a fifth switch lead 70, and a sixth switch lead 75 of the switch apparatus of the secondary battery for use in electric vehicle and the rupture switch (S30); transmitting the interrupt control signal to the battery relay contact 105 through a magnetic signal system in the battery relay coil unit 100 in order to control the battery relay contact 105 (S40); and controlling a relay connecting between the secondary battery for use in electric vehicle 110 and the drive motor delivering power to the electric vehicle in the battery relay contact 105 (S50).

Advantageous Effects

The safety apparatus and the protection method of the secondary battery for use in electric vehicle using the switch according to the present invention can safely protect destruction of the secondary battery caused by overcharge, short-circuit, reverse-connection and heat exposure of the secondary battery.

Further, there is an advantage in that the secondary battery can be protected by indirectly interrupting charging power source applied to the secondary battery using the switch, as compared with the method of destroying the secondary battery or directly interrupting the secondary battery if the internal pressure of the secondary cell increases.

Further, it is possible to avoid explosion and fire caused by the gas generated due to destruction of the secondary battery.

Further, it is possible to prevent the human body from being adversely affected by harmful gas generated due to destruction of the secondary battery.

DESCRIPTION OF DRAWINGS

The above and other objects, features and advantages of the present invention will become apparent from the following description of preferred embodiments given in conjunction with the accompanying drawings, in which:

FIG. 1(*b*) is a cross-sectional view showing a safety apparatus of a rupture disc-type secondary battery according to prior art.

FIG. 4(*b*) is a state view showing on-state of the adjacent switch according to the present invention.

FIG. 4(*c*) is a state view showing off-state of the adjacent switch according to the present invention.

FIG. 5(*b*) is a state view showing on-state of the micro switch according to the present invention.

FIG. 5(*c*) is a state view showing off-state of the micro switch according to the present invention.

FIG. 6(*b*) is a conception view showing the rupture switch attached to the pouch-type lithium polymer secondary battery according to the present invention.

Figure 1:
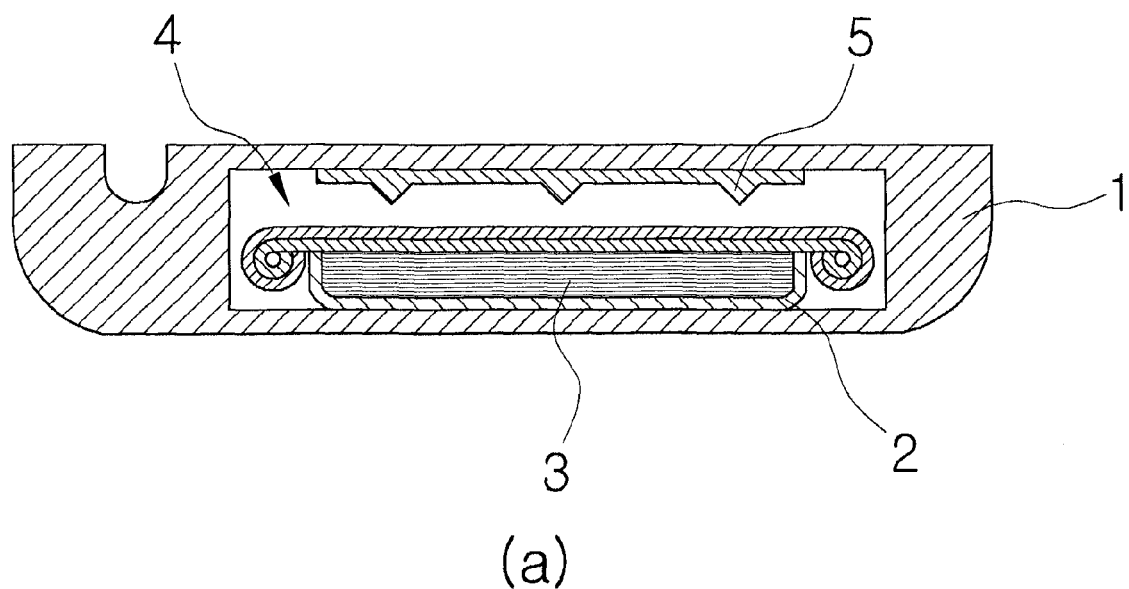
FIG. 1(*a*) is a cross-sectional view showing a safety apparatus of a secondary battery according to prior art.
Figure 1:
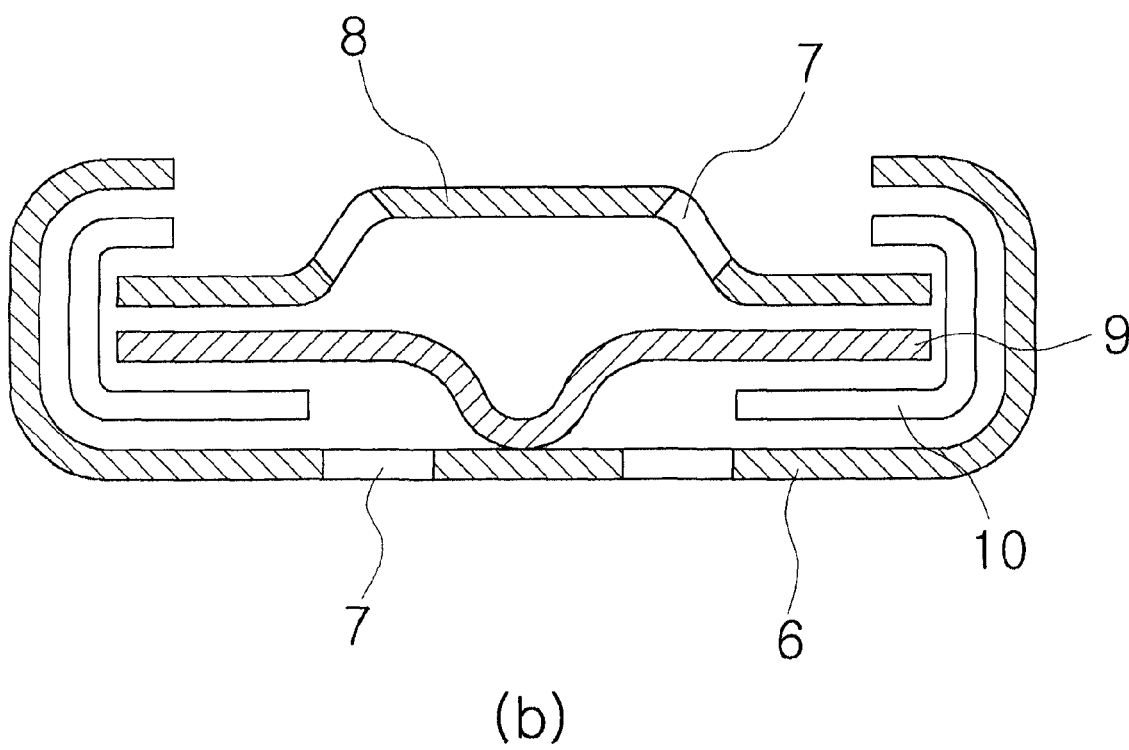

| [Detailed Description of Main Elements] | |
|---|---|
| 1: secondary battery pack | 2: case |
| 3: electrode assembly | 4: secondary battery |
| 5: projecting portion | 6: cap cover |
| 7: gas exhaust hole | 8: cap |
| 9: rupture disc | 20: pouch-type lithium polymer secondary battery |
| polymer secondary battery battery | 21: first secondary |
| | 10: insulating gasket |
| 22: second secondary battery | 23: switch unit |
| 24: operation inducing unit | 31: first coupling body |
| 32: second coupling body | 33: first switch lead |
| 34: second switch lead | 35: sealing case |
| 36: magnet | 41: first stationary contact |
| 42: second stationary contact | 43: movable contact |
| 44: third switch lead | 45: fourth switch lead |
| 46: spring | 47: press button |
| 48: housing | 50: first holding unit |
| 50-1: first holding hole | 50-2: second holding hole |
| 51-1: third holding hole | 52-1: fourth holding hole |
| 51: second holing unit | 52: third holding unit |
| 60: destruction unit | 61: first destruction unit |
| 62: second destruction unit | 70: fifth switch lead |
| 75: sixth switch lead | 80: battery controller |
| 81: output unit | |
| 90-1 to 90-n: rupture switches | |
| 100: battery relay coil unit | 105: battery relay contact |
| 106: first battery relay contact | |
| 107: second battery relay contact | |
| 110: secondary battery for use in electric vehicle | |
| 120: charging unit | |
| 130: inverter unit | 140: drive motor |
| 150-1 to 150-n: adjacent switches | |
| 160-1 to 160-n: micro switches | |

BEST MODE

Hereinafter, a safety apparatus and a protection method of a secondary battery for use in electric vehicle using a switch according to the present invention will be described in detail with reference to accompanying drawings. The accompanying drawings are provided as an example sufficiently to deliver an idea of the present invention to the person skilled in the art. Therefore, the present invention is not bounded by the drawings presented hereinafter but can be specified in another form. Further, like reference numerals denote like element throughout the following detailed description of the invention.

At this time, if the technological terms and science terms used herein do not have any other definition, they have meanings that can be typically understood by the person skilled in the art. Further, known functions and structures which can unnecessary make obscure the subject matter of the present invention in the following description and accompanying drawings will be omitted.

First, it will be described on a pouch-type secondary battery applied to the large capacity secondary battery according to the present invention, referring to FIG. 2.

Figure 2:
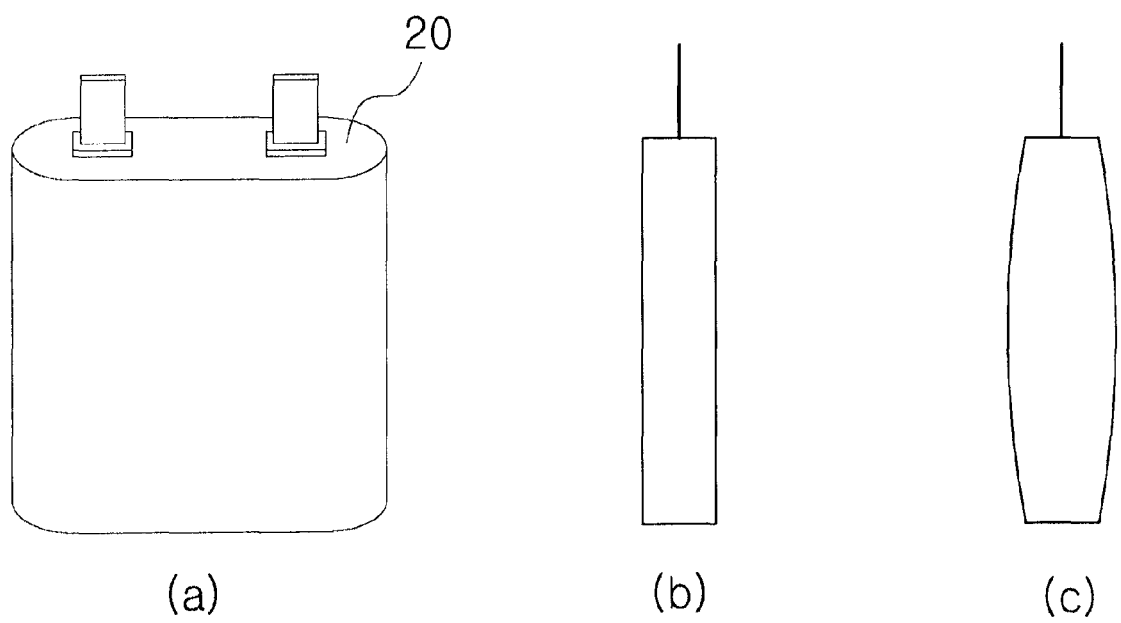
FIG. 2 is a conception view showing a pouch-type lithium polymer secondary battery.

FIG. 2(*a*) is a front view of the pouch-type secondary battery, FIG. 2(*b*) is side view of the pouch-type secondary battery, and FIG. 2(*c*) is a side view illustrating that the pouch-type secondary battery is swollen due to abnormal operation such as overcharge, short-circuit and reverse connection.

The pouch-type lithium polymer secondary battery 20 has an air-tight structure. If the pouch-type lithium polymer secondary battery 20 is exposed to excessive state such as overcharge, short-circuit, reverse-connection and heat exposure, the pouch-type lithium polymer secondary battery 20 generates gas therein. The pouch-type lithium polymer secondary battery 20 is swollen due to the gas. If the pouch-type lithium polymer secondary battery 20 continues to be swollen, a chemical material such as an electrolyte can be discharged from inside of the pouch-type lithium polymer secondary battery 20 and fire and explosion can be happened if the chemical material is severely discharged.

Figure 3:
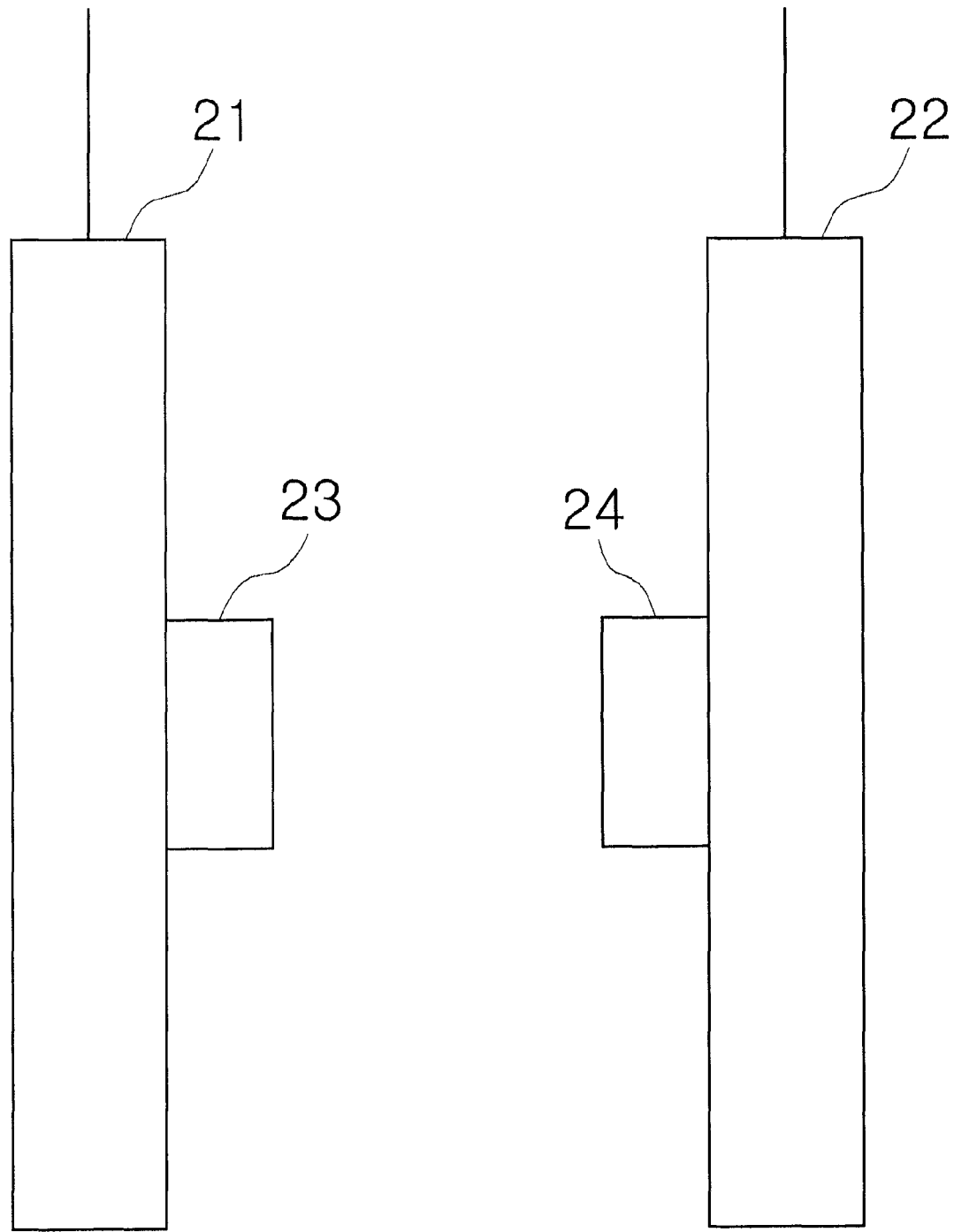
FIG. 3 is a conception view showing a switch apparatus according to the present invention.

Referring to FIG. 3, it will be described on a switch apparatus of the secondary battery for use in electric vehicle according to the present invention.

First, the switch apparatus of the secondary battery for use in electric vehicle is provided between the secondary batteries for use in electric vehicle in which at least one secondary battery is stacked.

As shown in FIG. 3, a first secondary battery 21 and a second secondary battery 22 are equipped with the switch apparatus. The switch unit 23 is provided one surface of the first secondary battery 21 and the operation inducing unit 24 is provided to operate the switch unit 24 on one surface of the second secondary battery 22 opposite to the switch unit 23.

At this time, if the first secondary battery 21 and the second secondary battery 22 are swollen, the switch unit 23 comes close to the operation inducing unit 24 to make the first secondary battery 21 and the second secondary battery 22 no longer swollen.

Then, the switch unit 23 can be equipped with an adjacent switch 150-1, a micro switch 160-1 and a rupture switch 90-1.

Hereinafter, operations of the adjacent switch 150-1, the micro switch 160-1 and the rupture switch 90-1 will be described through embodiments, respectively.

(Embodiment 1)

A first embodiment is directed to a safety apparatus and a protection method of the secondary battery for use in electric vehicle using the adjacent switch 150-1.

Figure 4:
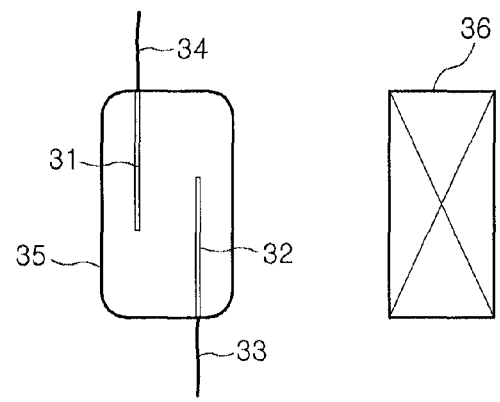
FIG. 4(*a*) is a conception view showing an adjacent switch.
Figure 4:
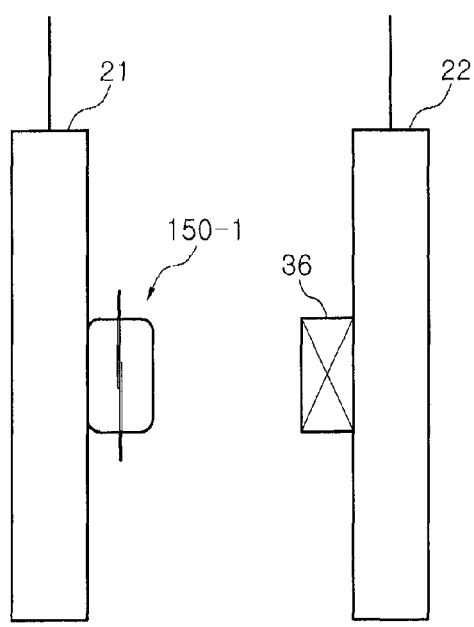
Figure 4:
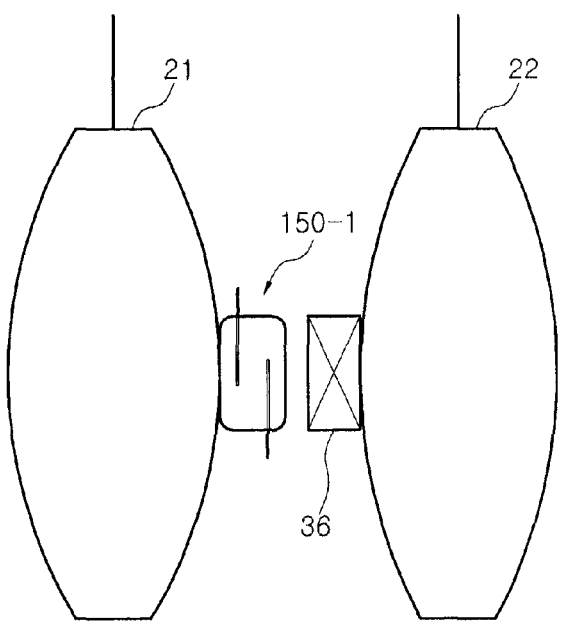
Figure 8:
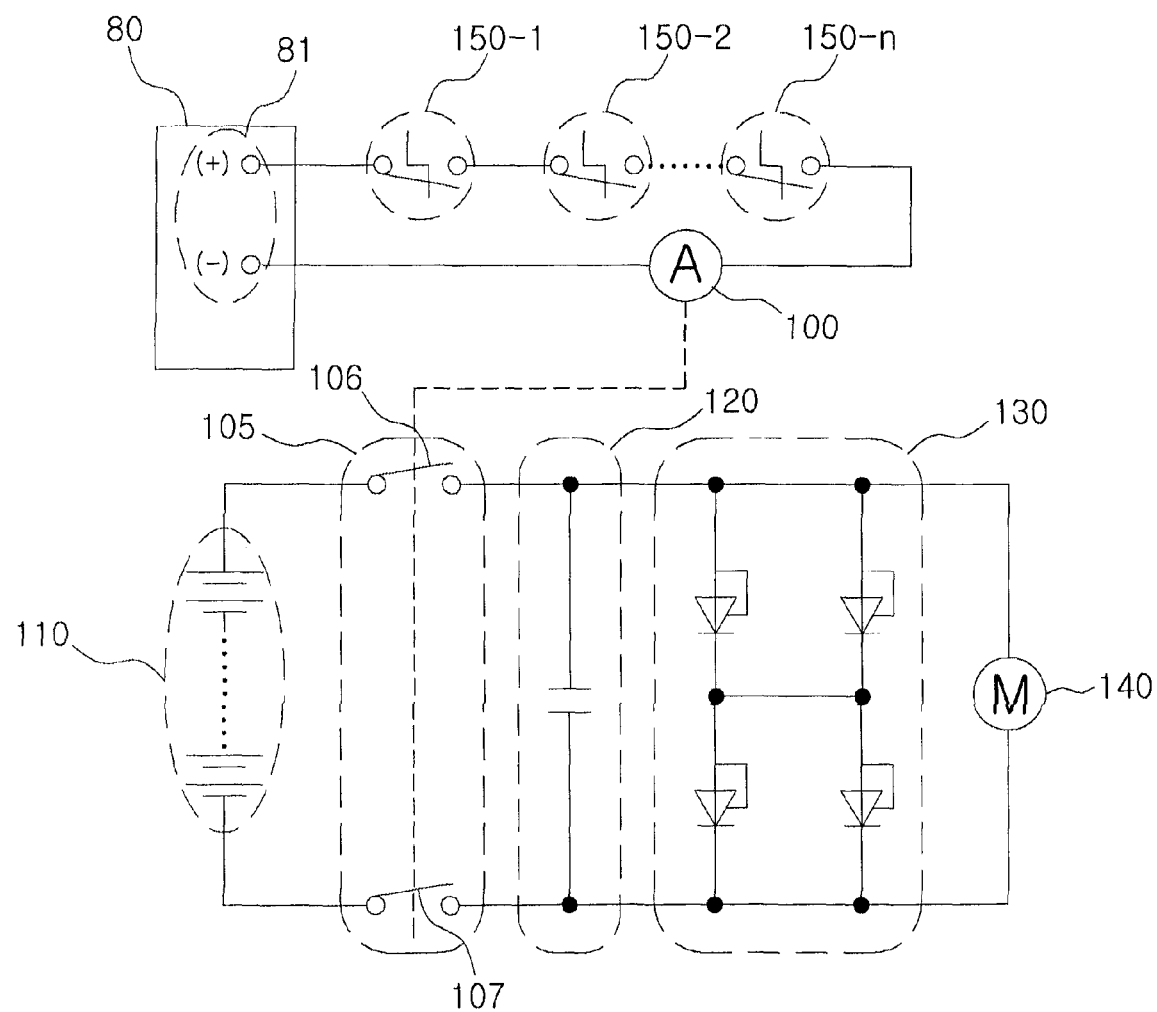
FIG. 8 is a battery control systematic view and a power systematic view of the electric vehicle drive motor, including a protection circuit to which the adjacent switch is applied according to the present invention.

FIG. 4(a) is a conception view of the adjacent switch; FIG. 4(b) is a state view showing on-state of the adjacent switch according to the present invention; FIG. 4(c) is a state view showing off-state of the adjacent switch according to the present invention; and FIG. 8 is a battery control systematic view and a power systematic view of the electric vehicle drive motor, including a protection circuit to which the adjacent switch is applied according to the present invention.

As shown in FIG. 4(a), a first coupling body 31 and a second coupling body 32 are provided within a sealing case 35 of the adjacent switch 150-1.

At this time, the first coupling body 31 is connected to a first switch lead 33 and the second coupling body 32 is connected to a second switch lead 34. In addition, a magnet for controlling the first coupling body 31 and the second coupling body 32 is provided together with the adjacent switch 150-1.

Meanwhile, an operation of the adjacent switch 150-1 will be briefly described as follows:

The adjacent switch 150-1 becomes off-state if the magnet 36 is close to the adjacent switch 150-1, and it becomes on-state again if the magnet 36 is far away from the adjacent switch 150-1.

Referring to FIG. 4(b) and FIG. 4(c), the on and off operation of the adjacent switch 150-1 will be described hereinafter.

As shown in FIG. 4(b), the adjacent switch 150-1 of on-state is provided on one surface of the first secondary battery 21 and the magnet 36 is provided on one surface of the second secondary battery 22.

As shown in FIG. 4(c), if the first secondary battery 21 and the second secondary battery 22 are swollen, the adjacent switch 150-1 is allowed to be close to the magnet 36. The first coupling body 31 and the second coupling body 32 which has been connected are separated by a prescribed distance due to a magnetic field of the magnet 36 so that the adjacent switch 150-1 is converted from on-state to off-state.

The adjacent switch 150-1 having such operational state is provided in the secondary battery for use in electric vehicle 110 to protect the destruction of the secondary battery for use in electric vehicle.

Referring to FIG. 8, it will be described on a battery control systematic view and a power systematic view of the electric vehicle drive motor, including a protection circuit to which the adjacent switch is applied according to the present invention.

As shown in FIG. 8, the protection circuit is structured such that at least one adjacent switch 150-1 is provided on an output unit 81 of a battery controller 80 and a battery relay coil unit 100 is connected to the adjacent switch 150-1.

The power systematic view of the electric vehicle drive motor has a battery relay point of contact 105 provided between the secondary battery for use in electric vehicle 110 and the electric vehicle drive motor 140 to connect the secondary battery for use in electric vehicle 110 with the electric vehicle drive motor 140

Further, a charging unit 120 for charging power generated from the secondary battery for use in electric vehicle 110 and an inverter unit 130 for controlling velocity and direction of the drive motor 140 are provided on the side of the drive motor 140.

Herein, the relay is consisted of the battery relay coil unit 100 and the battery relay contact of point 105 to control a connection between the secondary battery for use in electric vehicle 110 and the electric vehicle drive motor 140.

The battery relay coil unit 100 controls a first battery relay contact 106 and a second battery relay contact 107 of the battery relay contact 105 under the control of the battery controller 80.

Further, a plurality of control signals outputted from the battery relay coil unit 100 in accordance with an output type of the battery controller 80 is sent to the first battery relay contact 106 and the second battery relay contact 107 to control the connection between the secondary battery for use in electric vehicle 110 and the electric vehicle drive motor 140.

(Second Embodiment)

A second embodiment is directed to a safety apparatus and a protection method of the secondary battery for use in electric vehicle using the micro switch 160-1.

Figure 9:
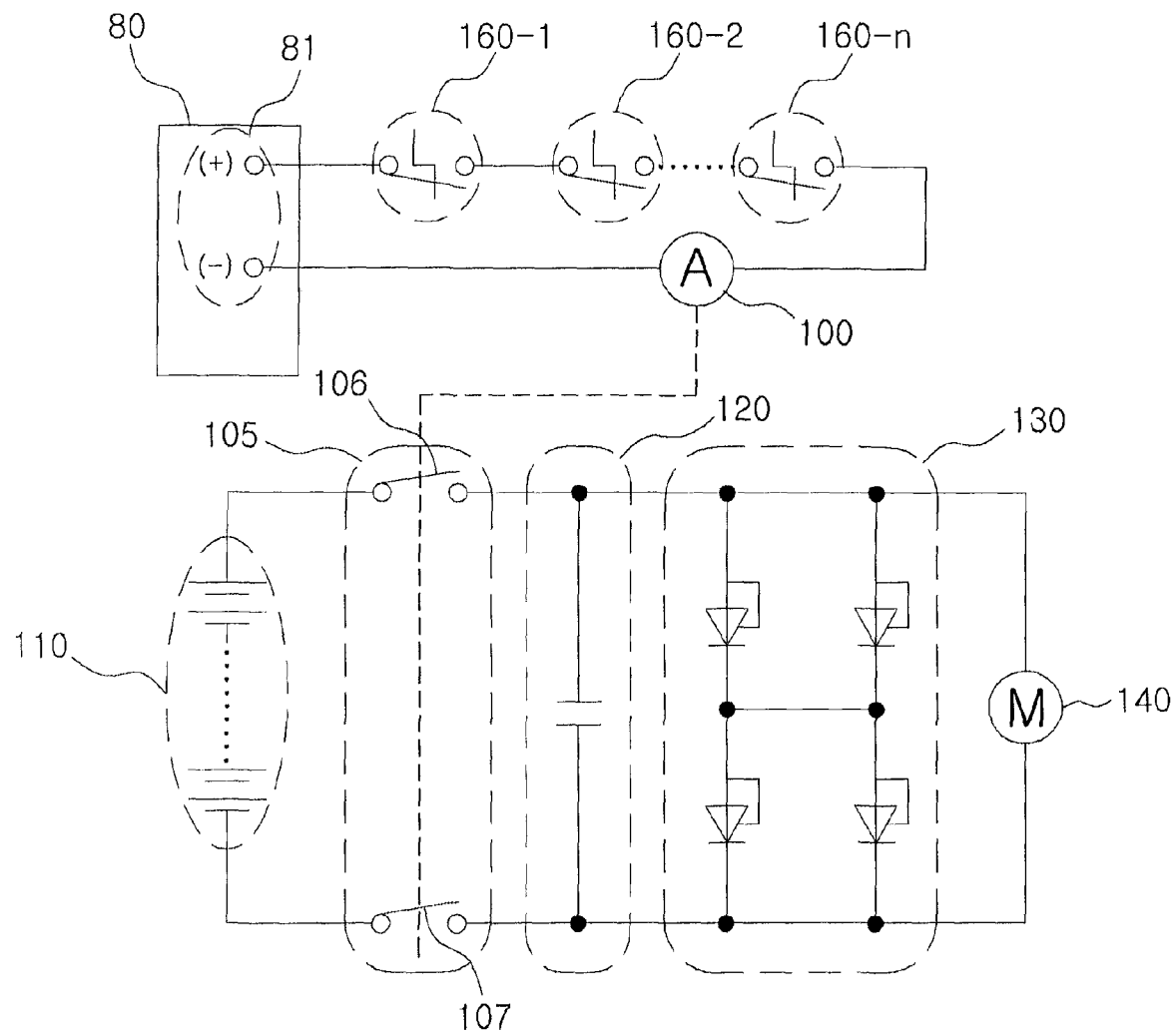
FIG. 9 is a battery control systematic view and a power systematic view of the electric vehicle drive motor, including a protection circuit to which the micro switch is applied according to the present invention.

FIG. 5(a) is a conception view showing a micro switch; FIG. 5(b) is a state view showing on-state of the micro switch according to the present invention; FIG. 5(c) is a state view showing off-state of the micro switch according to the present invention; and FIG. 9 is a battery control systematic view and a power systematic view of the electric vehicle drive motor, including a protection circuit to which the micro switch is applied according to the present invention.

As shown in FIG. 5(a), the micro switch 160-1 has a first stationary contact 41, a second contact 42 and a movable contact 43 provided within a housing 48.

At this time, a third switch lead 44 is connected to the movable contact 43 and a fourth lead 45 is connected to the first stationary contact 41.

Further, a press button 47 provided on one side of the movable contact 43 is projected to the outside of the housing 48 and a spring 46 is provided on the other side of the movable contact 43.

Hereinafter, an operation of the micro switch 160-1 will be briefly described.

The operation of the micro switch 160-1 becomes off-state if the press button 47 is pressed and becomes on-state again due to a force of the spring 46 if the press button 47 returns to an original state.

Figure 5:
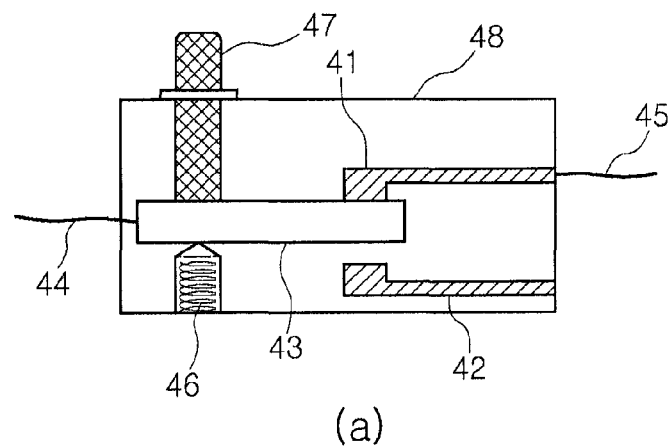
FIG. 5(*a*) is a conception view showing a micro switch.
Figure 5:
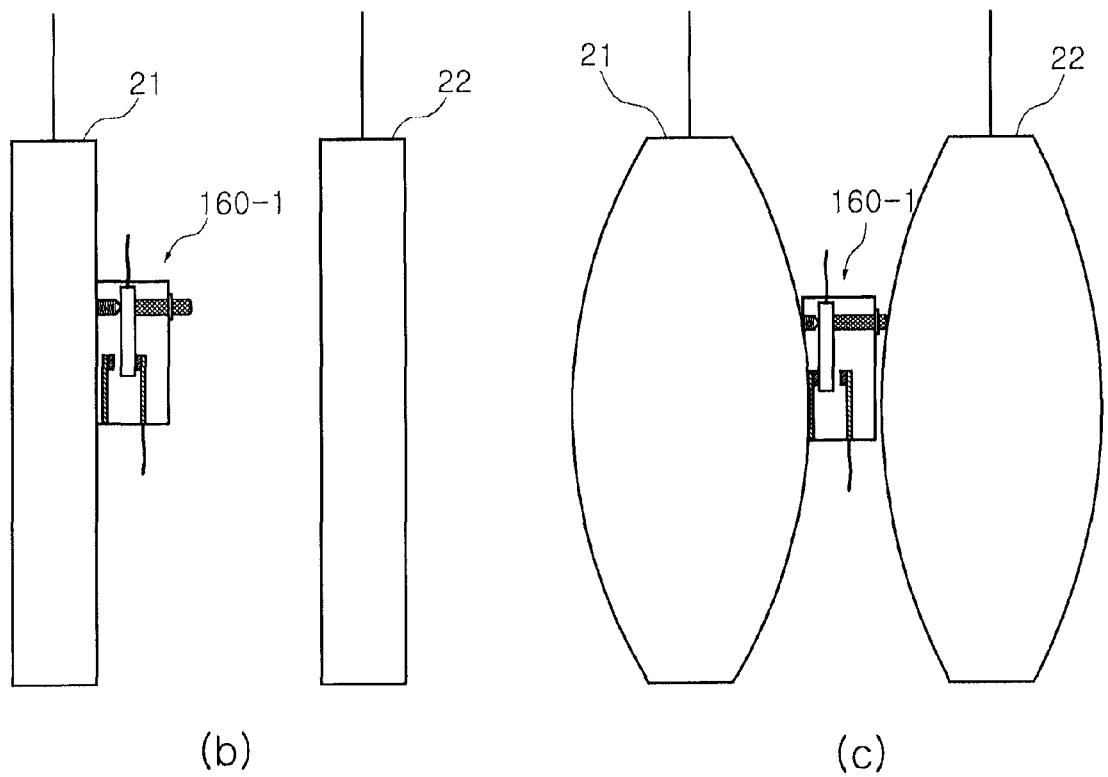

Referring to FIG. 5(*b*) and (*c*), the on and off operation-state of the micro switch 160-1 will be described.

As shown in FIG. 5(*b*), the micro switch 160-1 of on-state in that the first stationary contact 41 is connected to the movable contact 43 is provided on one side of the first secondary battery 21.

As shown in FIG. 5(*c*), if the first secondary battery 21 and the second secondary battery 22 are swollen, the second secondary battery 22 presses the press button 47 so that the movable contact 43 is separated from the first stationary contact 41 and connected to the second stationary contact 42 to cause the micro switch to be converted from on-state to off-state.

The above-mentioned micro switch 160-1 is included in the secondary battery for use in electric vehicle 110 to protect the destruction of the secondary battery for use in electric vehicle 110.

Referring to FIG. 9, it will be described on a battery control systematic view and a power systematic view of the electric vehicle drive motor, including a protection circuit to which the micro switch is applied according to the present invention.

As shown in FIG. 9, the protection circuit is structured such that at least one micro switch 160-1 is provided on the side of an output unit 81 of a battery controller 80 and a battery relay coil unit 100 is connected to the micro switch 160-1.

The power systematic view of the electric vehicle drive motor has a battery relay contact 105 provided between the secondary battery for use in electric vehicle 110 and the electric vehicle drive motor 140 to connect the secondary battery for use in electric vehicle 110 with the electric vehicle drive motor 140

Further, a charging unit 120 for charging power generated in the secondary battery for use in electric vehicle 110 and an inverter unit 130 for controlling velocity and direction of the drive motor 140 are provided on the side of the drive motor 140.

Herein, the relay is consisted of the battery relay coil unit 100 and the battery relay contact 105 to control a connection between the secondary battery for use in electric vehicle 110 and the electric vehicle drive motor 140.

The battery relay coil unit 100 controls a first battery relay contact 106 and a second battery relay contact 107 of the battery relay contact 105 under the control of the battery controller 80.

Further, a plurality of independent control signals outputted from the battery relay coil unit 100 in accordance with an output type from the battery controller 80 is sent to the first battery relay contact 106 and the second battery relay contact 107 to control the connection between the secondary battery for use in electric vehicle 110 and the electric vehicle drive motor 140.

(Third Embodiment)

A third embodiment is directed to a safety apparatus and a protection method of the secondary battery for use in electric vehicle using a rupture switch 90-1.

Figure 6:
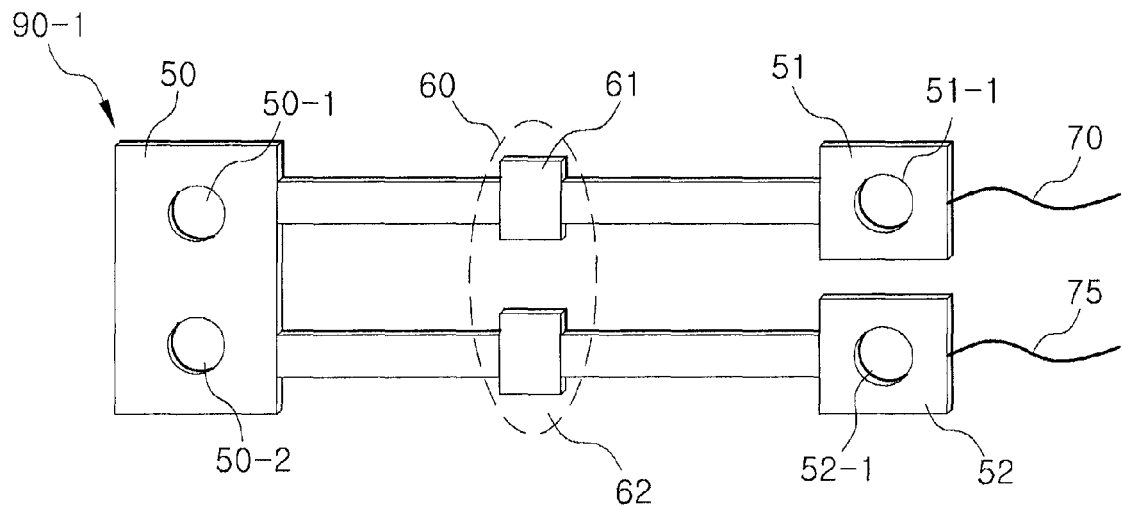
FIG. 6(*a*) is a conception view showing a rupture switch according to the present invention.
Figure 6:
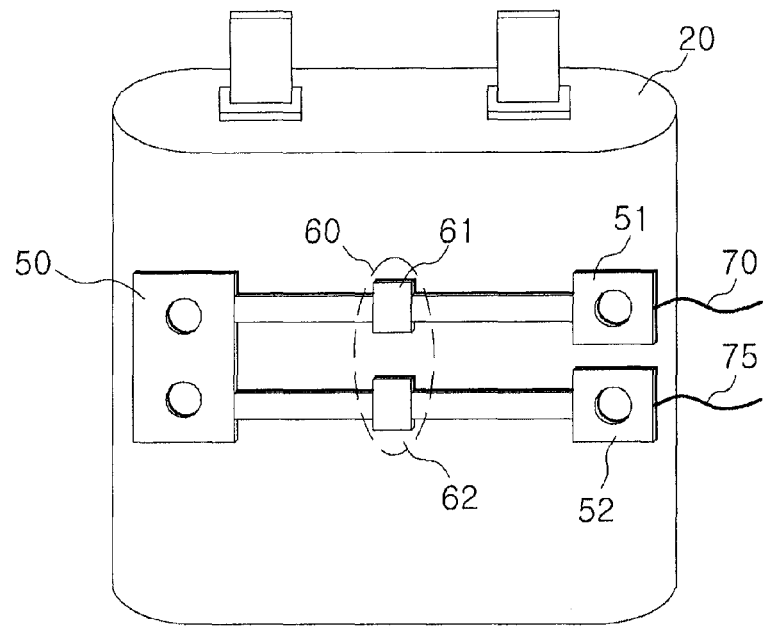

FIG. 6(*a*) is a conception view of a rupture switch according to the present invention, and FIG. 6(*b*) is a conception view of the rupture switch attached to the pouch-type lithium polymer secondary battery.

As shown in FIG. 6(*a*), the rupture switch 90-1 is consisted of a "U" type metal piece.

The rupture switch 90-1 is attached on one surface of the pouch-type lithium polymer secondary battery 20 using a first holding unit 50 provided on one side of the "U" type metal piece and a second holding unit 51 and a third holding unit 52 provided on both end of the other side of the "U" type metal piece.

The rupture switch 90-1 is held in the pouch-type lithium polymer secondary battery 20 using a first holding hole 50-1, a second holding hole 50-2, a third holding hole 51-1 and a fourth holding hole 52-1 provided in the first holding unit 50, the second holding unit 51 and the third holding unit 52 respectively.

The rupture switch 90-1 is attached and held on one side of the pouch type lithium polymer secondary battery 20 and equipped with a destruction unit 60 consisted of a first destruction unit 61 and a second destruction unit 62 on a center portion of it.

At this time, if the pouch type lithium polymer secondary battery 20 is exposed to overcharge, short-circuit, reverse connection or high temperature and thus undergoes a displacement greater than a prescribed value, the destruction unit 60 is destroyed by sensing the displacement.

Destroying the destruction unit 60 safely protects the pouch type lithium polymer secondary battery 20 by stopping the operation of the pouch type lithium polymer secondary battery 20 through a fifth switch lead 70 connected to the second holding unit 51 and a sixth switch lead 75 connected to the third holding unit 52 of the rupture switch 90-1.

At this time, it is preferable to apply flame-resistant insulating material having plasticity to overall surface of the rupture switch 90-1, in order to prevent the diffusion of an electric fire generated when the destruction unit 60 of the rupture switch unit 90-1 is destroyed.

Though the pouch-type lithium polymer secondary battery 20 can be taken as an example for the purpose of understanding the present invention, the rupture switch 901 can be attached to a typical secondary battery in various manners.

Figure 7:
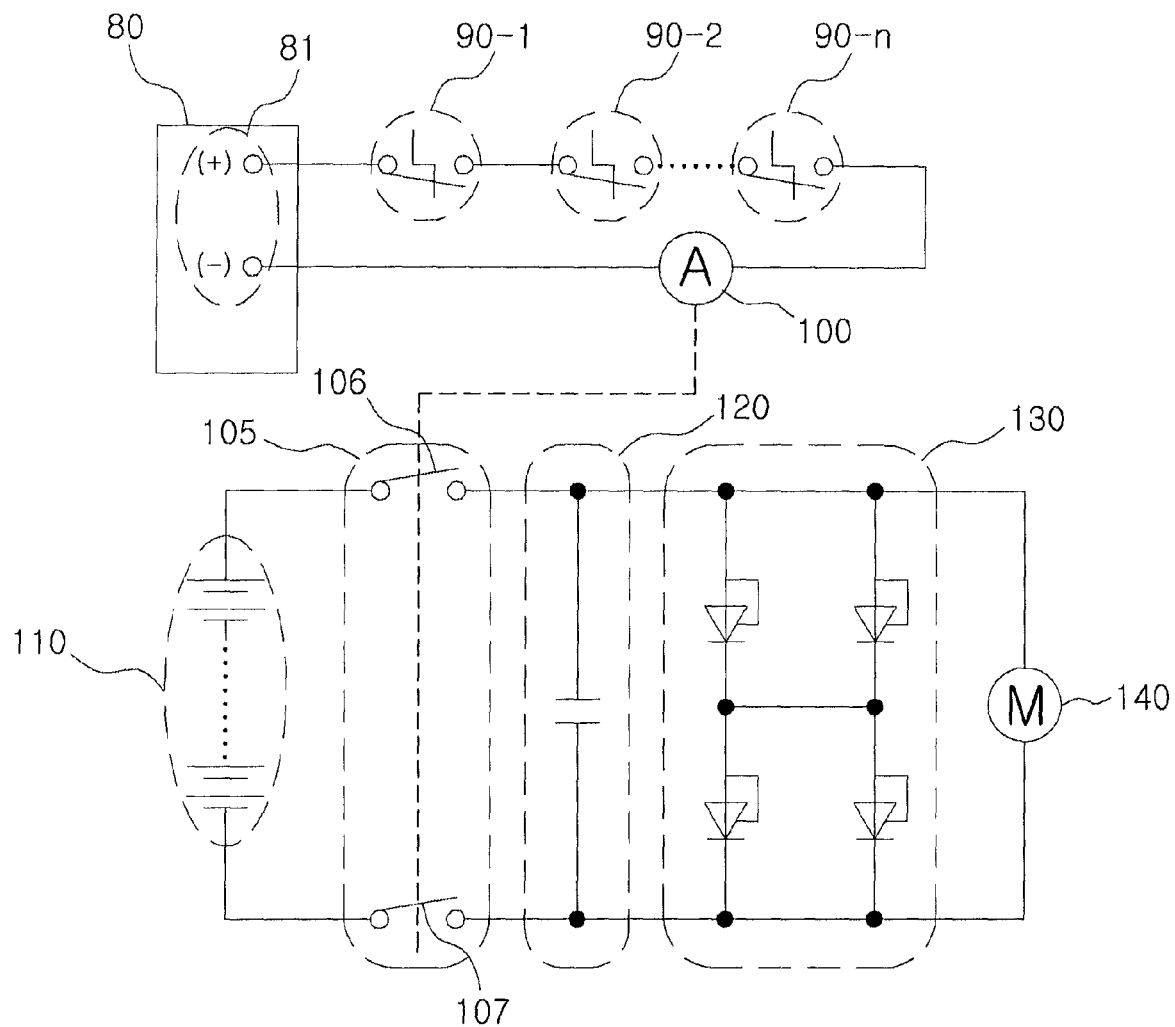
FIG. 7 is a battery control systematic view and a power systematic view of the electric vehicle drive motor, including a protection circuit to which the rupture switch is applied according to the present invention.

Referring to FIG. 7, a battery control systematic view and a power systematic view of the electric vehicle drive motor, including a protection circuit to which the rupture switch is applied according to the present invention will be described.

As shown in FIG. 7, the protection circuit has at least one rupture switch 90-1 provided on an output unit 81 of a battery controller 80 and a battery relay coil unit 100 connected to the rupture switch 90-1.

The power systematic view of the electric vehicle drive motor has a battery relay contact 105 provided between the secondary battery for use in electric vehicle 110 and the electric vehicle drive motor 140 to connect the secondary battery for use in electric vehicle 110 with the electric vehicle drive motor 140

Further, a charging unit 120 for charging power generated in the secondary battery for use in electric vehicle 110 and an inverter unit 130 for controlling velocity and direction of the drive motor 140 are provided on the side of the drive motor 140.

Herein, the relay is consisted of the battery relay coil unit 100 and the battery relay contact of point 105 to control a connection between the secondary battery for use in electric vehicle 110 and the electric vehicle drive motor 140.

The battery relay coil unit 100 controls a first battery relay contact 106 and a second battery relay contact 107 of the battery relay contact 105 under the control of the battery controller 80.

Further, a plurality of independent control signals outputted from the battery relay coil unit 100 in accordance with an output type from the battery controller 80 is sent to the first battery relay contact 106 and the second battery relay contact 107 to control the connection between the secondary battery for use in electric vehicle 110 and the electric vehicle drive motor 140.

Hereinafter, it will be described on the protection method of the secondary battery for use in electric vehicle using the adjacent switch 150-1, the micro switch 160-1 and rupture switch 90-1 according to the first embodiment, the second embodiment and the third embodiment respectively.

Figure 10:
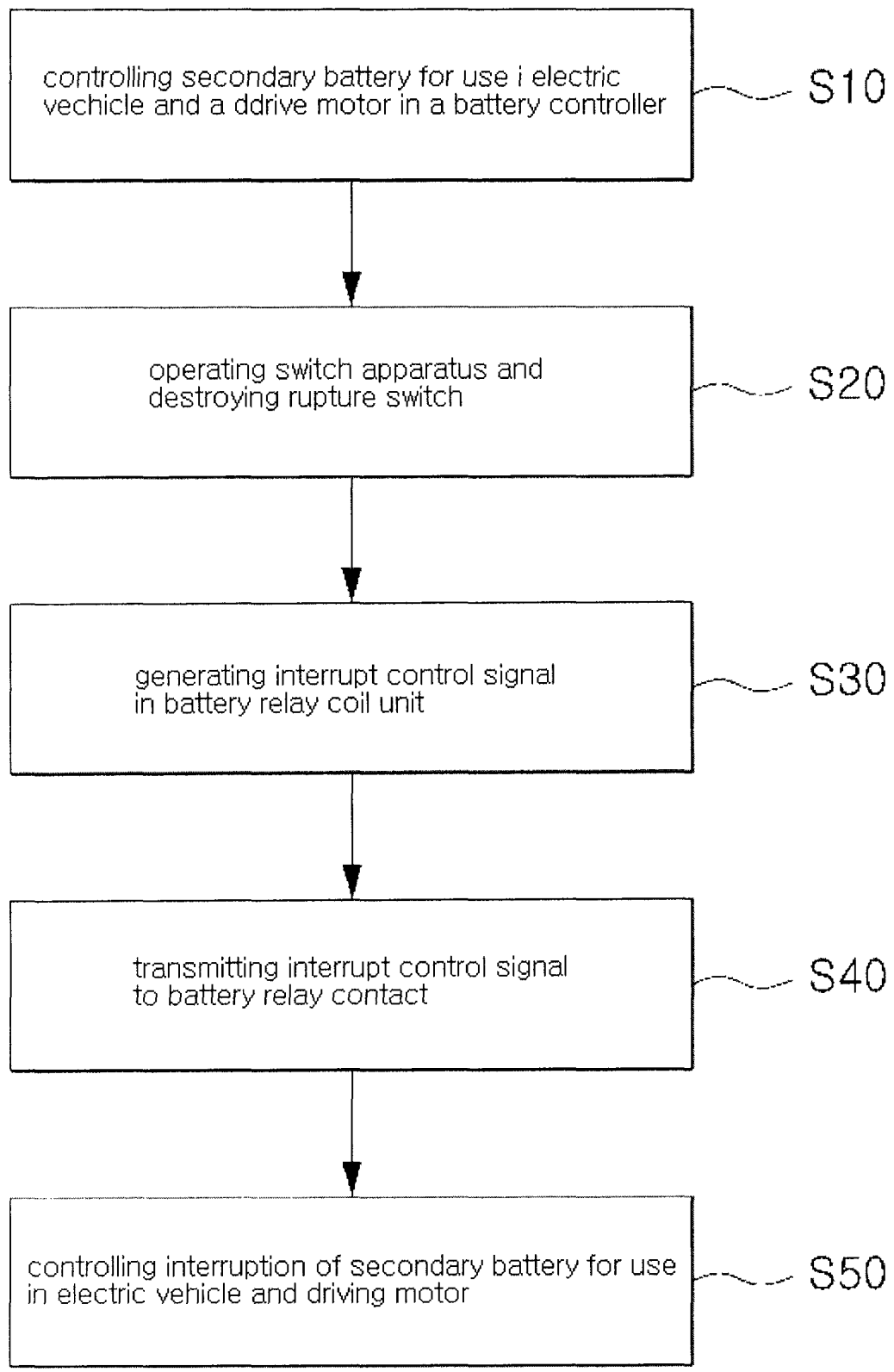
FIG. 10 is a sequential view showing a method of protecting destruction of the secondary battery for use in electric vehicle according to the present invention.

Referring to FIG. 10, the protection method of the secondary battery for use in electric vehicle according to the present invention will be described below.

The protection method of the secondary battery for use in electric vehicle 110 will be described taking as an example a case of using one rupture switch 90-1 for the purpose of understanding the present invention.

First, the battery controller 80 of the electric vehicle outputs a control signal to operate the secondary battery for use in electric vehicle 110 and monitor a state of the electric vehicle (S10).

If the secondary battery for use in electric vehicle 110 undergoes a displacement greater than a prescribed value, a physical displacement such as high temperature and internal pressure is occurred in the secondary battery for use in electric vehicle 110.

The rupture switch 90-1 attached on one surface of the secondary battery for use in electric vehicle 110 senses the physical displacement of the secondary battery for use in electric vehicle 110.

Then, the destruction unit 60 of the rupture switch 90-1 is destroyed if the physical displacement of the secondary battery for use in electric vehicle 110 is sensed (S20).

Comparing with the rupture switch 90-1, the adjacent switch 150-1 and the micro switch 160-1 become off-operation-state if the physical displacement of the secondary battery for use in electric vehicle 110 is sensed.

The destruction of the rupture switch 90-1 is delivered to the battery controller 80 through the switch lead of the rupture switch 90-1.

The battery controller 80 senses the destruction of the rupture switch 90-1 through the switch lead and controls the battery relay coil unit 100 to interrupt the secondary battery for use in electric vehicle 110 and the electric vehicle drive motor 140.

The battery relay coil unit 100 generates an interrupt control signal to interrupt the electric vehicle drive motor (S30).

The interrupt control signal is delivered to the battery relay contact 105 via a magnetic signal system of the battery relay coil unit 100 to control the battery relay contact (S40).

The battery relay contact 105 controls the first battery relay contact 106 and the second battery relay contact 107 in accordance with the interrupt control signal.

The secondary battery for use in electric vehicle 110 can be safely protected by interrupting the connection between the secondary battery for use in electric vehicle 110 and the electric vehicle drive motor 140 under the control of the battery relay contact 105 (S50).

Meanwhile, though only one battery relay coil unit 100 is shown for the purpose of understanding the present invention, the battery relay can control the first battery relay contact 106 and the second battery relay contact 107 independently through at least one relay coil in accordance with an output type of the battery controller 80.

Further, though the protection method of the secondary battery for use in electric vehicle 110 using one rupture switch 90-1 is described for the purpose of understanding the present invention, it is possible to obtain the same effect as that of the protection method even when using the adjacent switch 150-1 and the micro switch 160-1.

Further, the number of the adjacent switch 150-1, the micro switch 160-1 and the rupture switch 90-1 can be preferably a plural in accordance with the number of the secondary batteries used in the electric vehicle.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. A secondary battery for use in an electric vehicle having at least one secondary battery stacked, comprising:
    a switch unit provided on one surface of a first secondary battery; and
    an operation inducing unit provided on one surface of a second secondary battery opposite to the switch unit to cause the switch unit to be operated,
    wherein the switch unit is equipped with an adjacent switch,
    wherein the adjacent switch has a first joining unit connected to a first switch lead and a second joining unit connected to a second switch lead,
    wherein the operation inducing unit is configured with a magnet such that the adjacent switch becomes off-state by a magnetic force of the magnet if the adjacent switch is close to the magnet due to a swelling of the first secondary battery and the second secondary battery, and
    wherein the first joining unit and the second joining unit have elasticity such that the first joining unit and the second joining unit each move apart from one another in response to a magnetic force of the magnet if the adjacent switch is close to the magnet due to a swelling of the first secondary battery and the second secondary battery and each return to an original state if the adjacent switch is not close to the magnet.

2. The secondary battery for use in an electric vehicle according to claim 1, wherein the adjacent switch becomes on-state if the first joining unit is connected to the second joining unit, wherein the adjacent switch becomes off-state if the magnet is close to the adjacent switch such that the first joining unit is separated from the second joining unit by the magnetic force of the magnet, and wherein the first joining unit and the second joining unit return to an original state if the magnet is far away from the adjacent switch.

3. The secondary battery for use in an electric vehicle according to claim 1, wherein the adjacent switch has a sealing structure and a sealing case, and wherein the sealing case has an adhesive unit provided on one surface thereof.

* * * * *